(12) United States Patent
Ibezim et al.

(10) Patent No.: US 7,738,445 B2
(45) Date of Patent: Jun. 15, 2010

(54) COMBINED H.450.2 AND SIP CALL TRANSFER

(75) Inventors: James Ibezim, Ocean Township, Monmouth County, NJ (US); Amy Rupert, Punta Gorda, FL (US); Harish Samarasinghe, Holmdel, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1204 days.

(21) Appl. No.: 11/237,019

(22) Filed: Sep. 28, 2005

(65) Prior Publication Data

US 2006/0268754 A1 Nov. 30, 2006

Related U.S. Application Data

(60) Provisional application No. 60/678,061, filed on May 5, 2005.

(51) Int. Cl.
*H04L 12/66* (2006.01)
*H04L 12/28* (2006.01)

(52) U.S. Cl. .................. 370/352; 370/351; 370/466; 370/467

(58) Field of Classification Search .............. 370/351, 370/466, 467, 352
See application file for complete search history.

(56) References Cited

U.S. PATENT DOCUMENTS

| | | | |
|---|---|---|---|
| 5,838,683 | A | 11/1998 | Corley et al. |
| 5,875,234 | A | 2/1999 | Clayton et al. |
| 5,933,490 | A | 8/1999 | White et al. |
| 6,026,087 | A | 2/2000 | Mirashrafi et al. |
| 6,064,653 | A | 5/2000 | Farris |
| 6,185,204 | B1 | 2/2001 | Voit |
| 6,430,176 | B1 | 8/2002 | Christie, IV |
| 6,434,139 | B1 | 8/2002 | Liu et al. |
| 6,470,020 | B1 | 10/2002 | Barker et al. |
| 7,002,989 | B2 * | 2/2006 | Agrawal et al. ............. 370/467 |
| 2006/0233176 | A1 * | 10/2006 | Stumer ................ 370/395.2 |

FOREIGN PATENT DOCUMENTS

| | | |
|---|---|---|
| EP | 0 848 560 B1 | 4/2002 |
| WO | WO 2004/066604 A1 | 8/2004 |

OTHER PUBLICATIONS

Ackermann, R., et al., "An Open Source H.323-SIP Gateway as Basis for Supplementary Service Interworking", Proc. of the IP-Telephone Wkshp, Apr. 2, 2001, pp. 1-7.

Ackermann, Ralf, "Gateways and Components for Supplementary IP Telephony Services in Heterogeneous Environments", Dissertation, May 13, 2003, XP002392870 Darmstad.

(Continued)

*Primary Examiner*—Ahmad F Matar
*Assistant Examiner*—Oleg Asanbayev

(57) ABSTRACT

A method for supporting advanced features in a core SIP network when the calling party is in a network operating with the H.323 protocol is disclosed. Specifically, after processing the calls by collecting information associated with the advanced features, a REFER message is sent by an application server to an ingress border element associated with the calling party. The ingress border element then sends an H.450.2 FACILITY message containing the information in the SIP REFER message to an application gateway associated with the calling party. Upon receiving a SETUP message from the application gateway, the ingress border element then translates that SETUP message into a SIP INVITE message to establish the call.

1 Claim, 3 Drawing Sheets

OTHER PUBLICATIONS

Singh/Schulzrinne, Columbia University, "Interworking Between SIP/SDP and H.323; draft-singh-sip-h323-00.txt", IETF Standard-Working-Draft, IETF, CH, Jan. 10, 2000.

Glasmann, J., et al., "Service Development and Deployment in H.323 and SIP",Comp and Commun., 2001, Proc. 6th IEEE Symp on Jul. 3, 2001, Piscataway, NJ pp. 378-385.

Sparks/Johnston/Petrie,"Session Initiation Protocol Call Control-Transfer; draft-ietf- sipping-cc-transfer-04.txt" IETF Standard-Working-Draft, IETF,CH,vol.sipping, No. 4, Feb.

European Patent Office Search Report for Corresponding European Patent Application No. 06113170.2-2414.

Office Action from CA 2,544,802, Jan. 12, 2010, copy consists of 5 unnumbered pages.

\* cited by examiner

COMBINED H.450.2 AND SIP CALL TRANSFER

This patent application claims the benefit of U.S. Provisional Application No. 60/678,061, filed May 5, 2005, which is hereby incorporated by reference herein in its entirety.

BACKGROUND OF THE INVENTION

The conventional Public Switched Telephone Network (PSTN) is a circuit switched network in which calls are assigned dedicated circuits during the duration of the call. Such networks are well known in the art, and service providers have developed various services which may be provided to subscribers via such a conventional circuit switched network.

Recently, data packet networks, such as local area networks (LAN) and wide area networks (WAN) have become more prevalent. These data packet networks operate in accordance with the internet protocol (IP) and such networks are referred to as IP networks. The popularity of IP networks has created an interest in providing voice and related services over IP networks.

Conventional PSTN voice services dedicate a circuit connection between a calling and called party, and as such, that connection is guaranteed a certain level of performance because it is not shared with any other network users. IP networks, on the other hand, are shared networks in which the network resources are shared between users. The notion of a connection in a data packet network is very different from the notion of a connection in a circuit network. In a circuit network, the connection is a dedicated circuit which is used only by the calling and called parties. As such, it is easy to guarantee a certain level of service via the circuit network. However, the dedication of a circuit between all calling and called parties is frequently inefficient because such dedicated circuits provide more bandwidth than is necessary. In a data network, the connection between two parties is not dedicated, and traffic between the parties is transmitted via the data packet network along with the data packets of other users. There is no dedicated path between the parties, and data packets may be transmitted between the parties via different paths, depending upon network traffic.

In the PSTN, call setup and call control services are controlled by a signaling network in accordance with the well known Signaling System No. 7 (SS7). An SS7 network exists within the PSTN network and controls call setup by conveying labeled messages via signaling channels which are separate from the voice channels. The details of an SS7 network are well known and, therefore, the details will not be described in further detail herein.

Unlike traditional PSTN calls, voice calls placed over Voice over Internet Protocol (VoIP) networks employ a variety of call control services using a variety of signaling protocols, for example, H.323-over-IP and Session Initiation Protocol (SIP)-over-IP. The H.323 standard is a comprehensive and very complex suite of protocols that provide specifications for real-time, interactive videoconferencing, data sharing and audio applications such as IP telephony. The SIP protocol is a more recent protocol that was developed specifically for IP telephony in view of popular web-based services. More efficient than H.323, SIP takes advantage of existing protocols to handle certain parts of the call control process. Due in part to these advantages over the H.323 standard, SIP has recently been adopted in VoIP networks with greater frequency. However, while SIP-based telecommunications networks are advantageous, not all networks and components support SIP—many such networks, for example, still rely on the H.323 standard which uses different protocols. In contrast to the SS7 network utilized in the conventional PSTN network, messages in VoIP networks using VoIP signaling protocols, such as the H.323 and SIP protocols are not transmitted via a dedicated signaling network, but are transmitted like any other data packets.

Developing an architecture that facilitates communication services in networks relying on such multiple existing protocols is difficult. This difficulty arises because, as discussed above, different call control/signaling protocols use different signaling mechanisms and messages that are not recognized by other protocols. For example, in some implementations, originators of calls requiring advanced features use the H.323 protocol to access a communications provider's core SIP network. Therefore, there is a need to permit SIP networks to coexist with such more traditional networks, such as IP networks operating with a different protocol, such as the H.323 protocol.

SUMMARY OF THE INVENTION

The present invention improves call setup signaling in an internet protocol network. In accordance with one embodiment of the principles of the invention, advanced features in a core SIP network are supported, even when the calling party is in a network operating in accordance with the H.323 protocol. In particular, after processing the calls by collecting information associated with such features, a REFER message is sent by an application server to an ingress border element associated with the calling party. The ingress border element then sends an H.450.2 FACILITY message containing the information in the SIP REFER message to an application gateway associated with the calling party. Upon receiving a SETUP message from the application gateway, the ingress border element then translates that SETUP message into a SIP INVITE message to establish the call.

In one illustrative embodiment, when in ingress border element receives an admission request from a user in an H.323 network, the border element validates the admission request and, once the request is validated, receives a setup message from the user. The border element then sends a SIP invite to a call control element in the core SIP network. When the border element receives a REFER message from the call control element, the border element sets up the call by sending an H.450.2 FACILITY message to an application gateway in the H.323 network.

DETAILED DESCRIPTION

Figure 1:
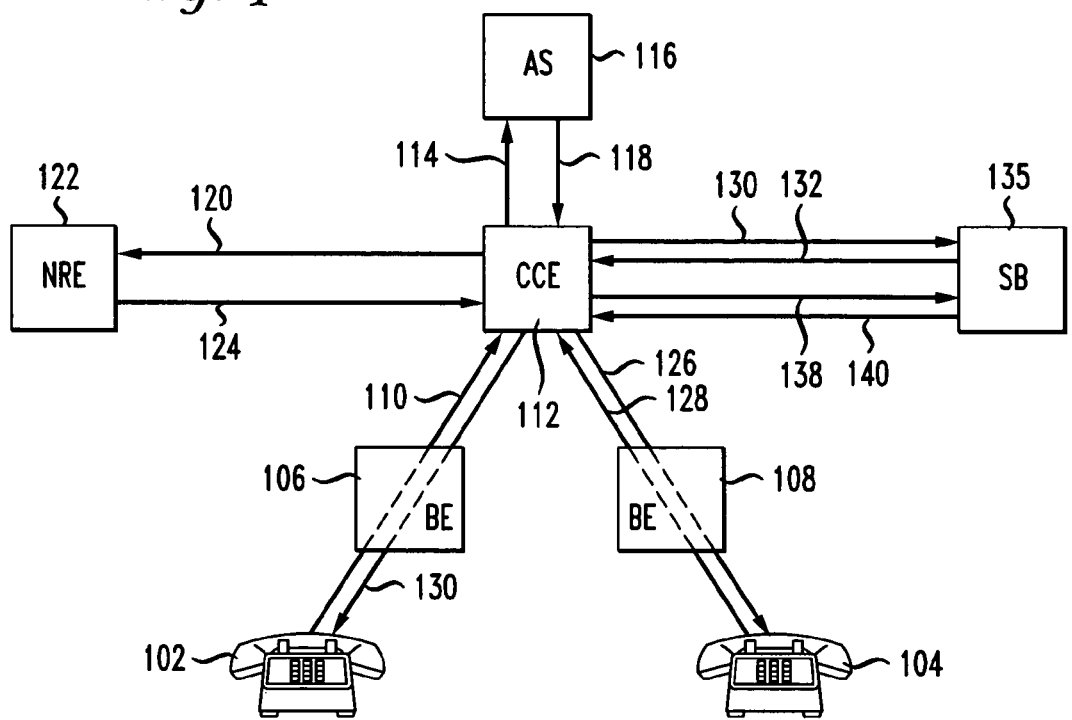
FIG. 1 shows an IP network in which one embodiment of the present invention may be implemented.

FIG. 1 shows an IP network in which one embodiment of the present invention may be implemented. The network utilizes the Session Initiation Protocol (SIP) in order to set up connections (e.g., VoIP calls) between users. As discussed previously, SIP is a well known application-layer control protocol used to establish, modify and terminate sessions such as IP telephony calls. SIP is described in detail in Internet Engineering Task Force (IETF) Request for Comments (RFC) 3261; SIP: Session Initiation Protocol; J. Rosenberg, H. Schulzrinne, G. Camarillo, A. Johnston, J. Peterson, R. Sparks, M. Handley, E. Schooler; June 2002, which is incorporated by reference herein. The details of SIP will not be described herein, as the protocol is well known to those skilled in the art. The protocol will be described only insofar as necessary for an understanding of the present invention.

With reference to FIG. 1, it is to be understood that the network elements shown in FIG. 1 are logical entities. Such logical entities may be implemented in various hardware configurations. For example, these network elements may be implemented using programmable computers which are well known in the art. Such programmable computers would have the required network interfaces to allow for network communication, as well as appropriate software for defining the functioning of the network elements. Such software is executed on one or more computer processors which control the overall operation of the network elements via execution of such software. The detailed hardware and software configuration of the network elements will not be described in detail herein. One skilled in the art of data networking and computers could readily implement such network elements given the description herein. As used herein, a network element refers to a logical entity which performs a network function. A network node refers to the computing platform on which a network element is implemented.

Referring now to FIG. 1, assume that IP enabled telephone 102 in a SIP network wishes to initiate an IP telephony call to IP enabled telephone 104. In FIG. 1, telephone 102 is connected to a border element (BE) 106 which provides telephone 102 access to the IP network. Similarly, telephone 104 is connected to BE 108 which provides telephone 104 access to the IP network. In the example of FIG. 1, the transaction begins by telephone 102 sending an INVITE request 110 addressed to telephone 104's Uniform Resource Identifier (URI) which identifies telephone 104. The INVITE request contains a number of header fields which are named attributes that provide additional information about a message. The details of an INVITE are well known and will not be described in detail at this point.

The INVITE message 110 is received at the call control element (CCE) 112. The CCE 112 performs the functions of interfacing with other network elements such as Border Elements (BE) 106 and 108, Service Broker (SB) 135, Application Server (AS) 116, Media Servers (MS), Network Routing Engine (NRE) 122, and other network elements, to provide the necessary functions to process a call request. The CCE 112 determines whether special feature processing is required by the call by sending an INVITE message 130 to service broker (SB) 135. Examples of special processing are 8YY (e.g., 800) calls or Software Defined Network (SDN) calls. The SB 135 determines whether special processing is required based on call information it receives in the INVITE message 130. It is noted that while the SB function is a separate logical function from the CCE, the SB function may be contained in the CCE network element or a standalone network element. If special feature processing is required, the SB 135 determines the appropriate application server, here AS 116, to provide the special feature processing for the call. The SB 135 sends a REDIRECT message 132 to the CCE 112 indicating the IP address of application server 116 to provide the feature processing. The CCE 112 sends a query (an SIP INVITE) 114 to AS 116. At this point, the AS 116 has been inserted into the signaling path for the call setup signaling being described herein.

The AS 116 contains the intelligence for offering intelligent network services such as local, toll-free, virtual private networks, and various multimedia features such as email and click-to-dial. Upon the AS 116 being inserted into the signaling path for the call setup, the AS 116 performs the steps shown in FIG. 2. First, the AS 116 determines in step 202 whether it is required in the signal path for call setup. If the AS 116 is required in the signal path, at step 204 the AS 116 executes service logic (e.g., computer program code) and performs the required feature processing which may include, for example, reference to one or more Media Servers (MS) to collect information from the caller. Once all features have been processed, the AS 116 sends a REFER message containing a new routing number to the initiator of the call for further processing to set up the call and, at step 206, to remove the AS 116 from the signal loop.

Figure 2:
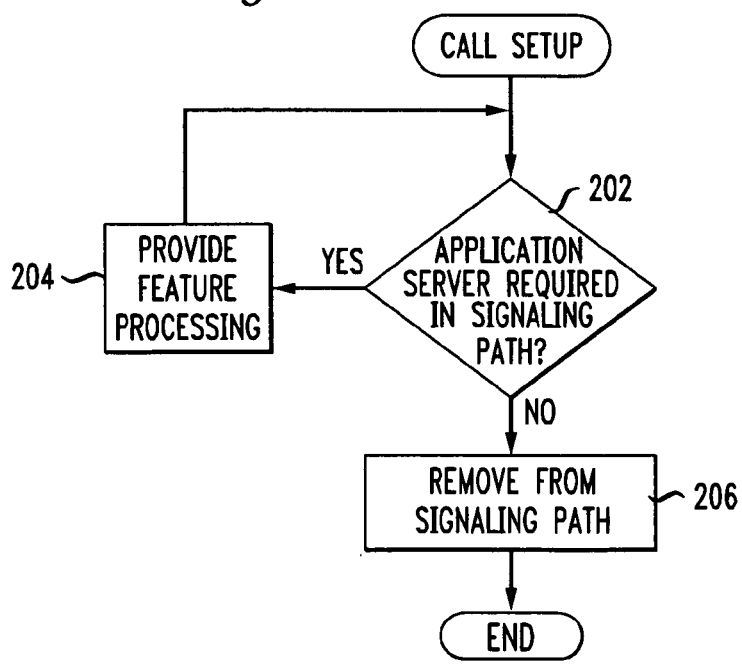
FIG. 2 shows the steps performed by an application server in accordance with one embodiment of the invention.

The above general call flow of FIG. 2 for establishing a call in the network illustrated in FIG. 1 assumes that the telephone originating the call (i.e., telephone 102) is located in a network using the SIP protocol. However, as discussed previously, many user networks use other protocols such as, illustratively, the H.323 suite of protocols. The present inventors have recognized that, for calls originating from such H.323 networks and accessing a core network using the SIP protocol, as described above, some advanced features may not be possible. Specifically, similar to the call flow described above, advanced features, such as the well-known 8YY "Prompt & Collect" and "Courtesy Response" features that require that SIP messages be sent from the core network (e.g., the AS or CCE) to the originator of the call. For example, as described above, such services typically involve an application server sending a SIP REFER message to the call originator in order to connect a call between the originator and a new called party in response to the information collected by the application server. This has typically not been possible when a call originated from an H.323 user network because of the fact that, if a SIP REFER message is sent from the AS 116 to the initiator of the call in the H.323 network (e.g., telephone 102 if that telephone is in an H.323 network), the message is not directly recognized by the H.323 protocol. As a result, the message cannot be transmitted to the user in the originating network operating on that protocol and, it follows, the service in question (e.g., Prompt and Collect/Courtesy Response) cannot be provided.

Therefore, the present inventors have invented a method to facilitate advanced features in calls, such as an advanced 8YY call. Specifically, the SIP REFER message is translated into an H.323 call transfer message, discussed further below, which is then sent to the call originator. This permits application/media server interaction in a SIP network for an originator using H.323 protocol access. As discussed previously, the H.323 protocol is not a single protocol but, instead, is a suite of protocols that are used for discrete call control and signaling functions in a packet based network. The call transfer function in an H.323 network is governed by the H.450.2 standard protocol. The H.450.2 protocol is described in ITU-T Recommendation H.450.2, "Call Transfer Supplementary Service for H.323," 1998, which is hereby incorporated by reference herein in its entirety. As was the case with the discussion pertaining to SIP, the details of H.323 and the call transfer functions of the H.450.2 protocol will not be described herein, as the protocol is well known to those skilled in the art. The protocol will be described only insofar as is necessary for an understanding of the present invention.

Figure 3:
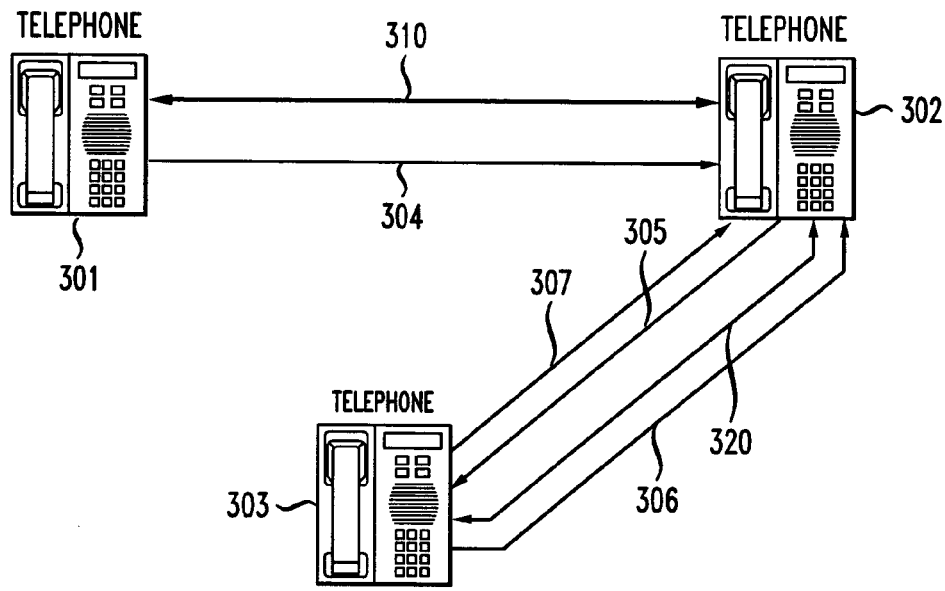
FIG. 3 is a call flow showing how an H.450.2 call transfer is accomplished in an H.323 network.

FIG. 3 shows a network in which an illustrative high-level call transfer using the H.450.2 protocol may occur in a traditional H.323 implementation. Unlike the SIP example discussed above, after a call has been established between, for example, telephone 301 and telephone 302, some call control functions may be accomplished directly between the two telephones with no interaction with, for example, a CCE such as CCE 112 in FIG. 1. The H.450.2 protocol is one protocol in which such signaling may occur directly between the users. In particular, assume a call 310 is already established between user telephone 301 and user telephone 302 and that the user of telephone 301 wishes to transfer the call to form a new call 320 between user telephone 302 and user telephone 303. After the user indicates his desire to initiate such a transfer, telephone 301 sends an H.450.2 FACILITY message 304 to telephone 302 with the ctInitiate parameters, which are well known in the art. These parameters contain, among other elements of information, the address of telephone 303. Upon receiving the FACILITY message, telephone 302 sends an H450.2 SETUP message 305 with ctSetup parameters. This new call may inherit any existing media capabilities of the call between telephone 301 and 302 or, alternatively, may negotiate new media capabilities. The ctSetup parameters contain information about the transferring telephone 301, which can be displayed to the user of telephone 303 or, for example, may be used by other features and applications such as call admission and/or billing. In response to the SETUP message, telephone 303 sends a return response ALERTING message 306 with ctSetup parameters to telephone 302. When this message is received by telephone 302, telephone 302 disconnects the first call with telephone 301. The user of telephone 302 will hear, for example, a ringing tone until telephone 303 goes off hook, as is indicated by a CONNECT message 307 sent from telephone 303 to telephone 302. After the CONNECT message is received by telephone 302 from telephone 303, the call 320 between those telephones is established.

Therefore, the H.450.2 protocol is largely concerned with call transfer in an H.323 network. The present inventors have recognized, however, that in addition to the basic call transfer function as traditionally implemented and as discussed above, that protocol may also be used to facilitate certain functions in a combined SIP/H.323 network, for example where a user is located in an H.323 network that interfaces with a SIP core network.

Figure 4:
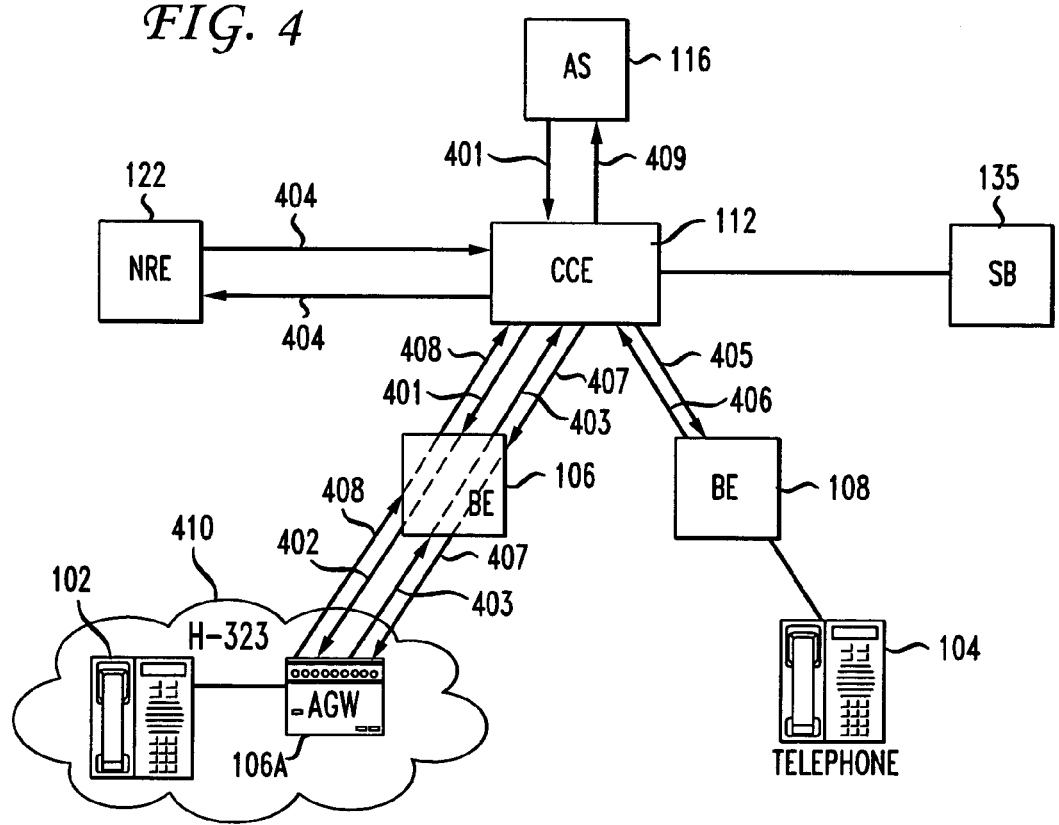
FIG. 4 shows a high level call flow in a network whereby the H.450.2 call transfer function is used in conjunction with a SIP core network.

FIG. 4 shows an illustrative network showing the high level message flow in accordance with the principles of one embodiment of the present invention. As discussed above, when a call requesting special features is made by telephone 102, the AS 116 collects and validates user input given in response to MS interaction. This input contains, illustratively, a new routing number to which the call is to be connected. The AS 116 initiates a SIP REFER message 401 to the initiator of the call to transfer the call to the new routing number. Specifically, the REFER message 401 carries the recording information to ingress Border Element (BE). As discussed above, if the originating user is in an H.323 network 410, then the REFER message 401 cannot be sent directly to that user. Accordingly, upon receipt of the REFER message, the ingress BE 106 executes the H.450.2 call transfer capability and sends a FACILITY message 402 with ctInitiate parameters to an Application Gateway (AGW) 106A corresponding to the network of the originating user of telephone 102. One skilled in the art will recognize that, while the AGW 106A of FIG. 4 is shown as a separate element for ease of illustration, other network configurations are possible. For example, the functionality of the AGW 106A, as described herein, may be integrated directly into BE 106.

In response to receiving the FACILITY message 402, the AGW 106A sends a SETUP message 403 with ctSetup parameters to the CCE 112 in order to forward the call request to the new destination number collected by the AS 116. The CCE 112 communicates via messages 404 with the NRE 122 function to obtain routing information in order to route the call to the destination called party number. The CCE 112 then sends a SETUP message 405 to the corresponding egress BE 108 in order to establish a connection. Upon receipt of a RINGING message 406 from the BE 108 (or an ALERTING message if the interface is H.323), the CCE sends an ALERTING message 407 with ctSetup parameters to the AGW 106A. After receiving the ALERTING message 407, the AGW 106A sends a RELEASE COMPLETE message 408 with ctInitiate parameters to the CCE to close the logical channel. The CCE then sends a NOTIFY message 409 to the AS 116. The AS 116 then removes itself from the control signaling path and the call is established between telephone 102 and telephone 104. In this way, advanced features may be supported for calls requiring advanced feature processing in a SIP network even if the originator of the call is in an H.323 network.

Figure 5:
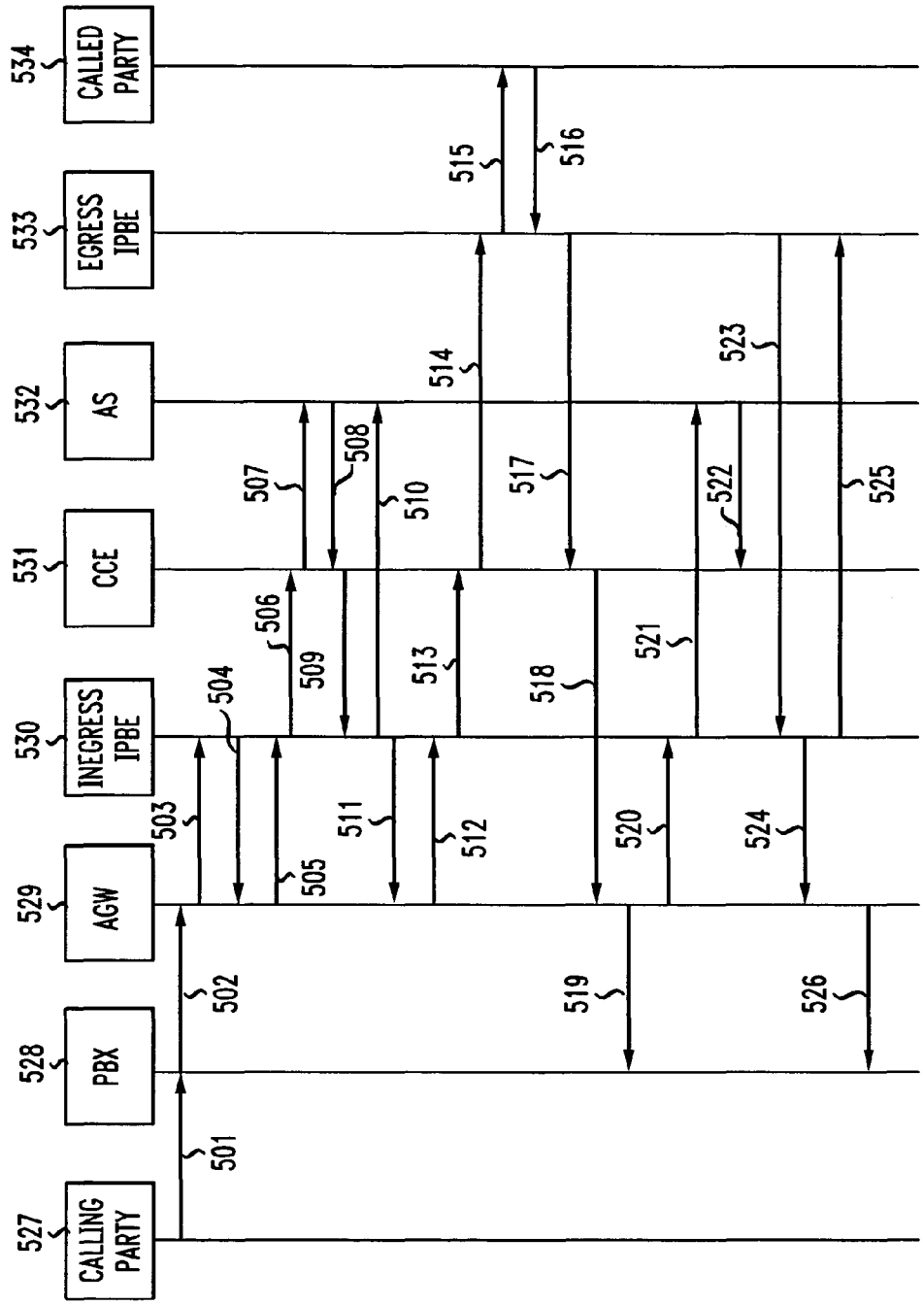
FIG. 5 shows a detailed call flow whereby the H.450.2 call transfer function is used to provide advanced features in a SIP core network.

FIG. 5 shows one illustrative embodiment of a detailed call flow using the high level call transfer method of FIG. 4. The call flow diagram of FIG. 5 shows the network nodes of FIG. 4 and the signal flow, represented by arrowed lines, between those nodes. Specifically, referring to FIG. 5, to initiate a call requiring advanced feature processing, the calling party 527 in an H.323 network dials a number and the call 501 arrives at an illustrative PBX 528. The PBX 528 then determines that the call needs to be routed to the application gateway (AGW) 529 for entry into the SIP core network and, therefore, forwards call 502 to that AGW. In response, the AGW 529 sends an admission request message 503 to the ingress IP border element (IPBE) 530. Upon receipt of the admission request message from the AGW 529, the ingress IPBW 530 validates the call request and sends an admission request confirmation response message 504 to the AGW 529 indicating that it can proceed with the call. The AGW 529 then sends a SETUP message 505 to the ingress IPBE 530. Upon receipt of the SETUP message, the ingress IPBE 530 initiates an INVITE 506 containing the information received in the SETUP message to the CCE 531. Upon receipt of the INVITE, the CCE 531 executes the SB functionality to determine which AS is needed and sends the INVITE in message 507 to the appropriate AS 532. Upon receipt of the INVITE, the AS 532 uses the dialed number to derive the customer ID and accesses the customer account. In this illustrative example, the AS 532 determines that it needs to invoke a Media Server to play announcements and collect user input to further process the call. Once the input is collected, the AS 532 validates the input and determines the routing number for the call. Then the AS 532 sends a REFER message 508 to the CCE 531 to transfer the call request to the routing number indicated in the Refer-To header of the REFER message. This REFER message contains the recorded information and instructions collected by the MS. Upon receipt of the REFER message, the CCE 531 stores the recording instructions and information received from the AS 532 and proxies the REFER 509 to the ingress IPBE 530. When the ingress IPBE 530 receives the REFER message, the IPBE 530 sends an ACCEPTED message 510 to the AS 532 and then executes the H.450.2 call transfer function by sending a FACILITY message 511 with ctinitiate parameters to the AGW 529 to transfer the call.

When the AGW 529 receives the FACILITY (ctinitiate) message 511, the AGW 529 sends a SETUP message 512 with ctSetup parameters to the CCE 531 to transfer the call to the new destination. In response, the ingress IPBE 530 sends an INVITE message 513 to the CCE 531 based on the information received in the SETUP message 512. The CCE 531 then executes the SB function and determines that no query is required to an AS (since the information has already been collected at an earlier step). The CCE 531 then executes the NRE functionality and determines the egress IPBE 533 address corresponding to the called party and proxies the INVITE to the egress IPBE 533 as message 514. Upon receipt of the INVITE from the CCE 531, the egress IPBE 533 proxies the INVITE message to the called party 534. When the call is pending, the egress IPBE 533 receives a RINGING message 516, which it sends as message 517 to the ingress IPBE 530 via the CCE 531. The ingress IPBE 530 formulates and sends an ALERTING message 518 to the AGW 529 and, in response, the AGW 529 sends an appropriate signaling message 519 to the PBX 528 of the calling party 527. Once the call is connected, the AGW 529 sends a RELEASE COMPLETE message 520 with ctInitiate parameters to the ingress IPBE 530 to close the logical channel. The ingress IPBE 530 then sends a NOTIFY message 521 to the AS 532 in response to the REFER via the CCE 531.

The AS 532 then sends a 200 OK message 522 to the CCE 531 in response to the NOTIFY message to the ingress IPBE 530 via the CCE 531. The egress IPBE 533 responds by sending a 200 OK message 523 to the ingress IPBE 530 via the CCE 531. The ingress IPBE 530 then sends a CONNECT message 524 to the AGW 529 and an ACK 525 back to the egress IPBE 533 acknowledging the IPBE. The AGW 529 sends an appropriate signaling message to the PBX 528 and, at this point, the media path is established between the calling party 527 and the called party 534. Thus, as is described hereinabove, advanced features are supported for 8YY and other calls in a SIP network even though the originating caller is located in an H.323 network.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for providing a feature to a call in a SIP-based core network between a first user and a second user, said method comprising:
   receiving by a call control element (CCE) a first INVITE message from an ingress border element, wherein said ingress border element interfaces an H.323 network with said SIP-based core network;
   invoking an application server to provide at least one feature to said call;
   invoking a media server to collect information associated with said feature from said first user;
   receiving by said CCE a REFER message from said application server, said REFER message comprising said information collected by said media server;
   sending said REFER message to said ingress border element;
   receiving a second INVITE message by said CCE from said ingress border element;
   determining by said CCE an address for a second user associated with an egress border element; and
   sending said second INVITE message to said egress border element.

* * * * *